United States Patent [19]

Thompson et al.

[11] 3,752,306
[45] Aug. 14, 1973

[54] GEL ENCAPSULATING ENCLOSURE AND METHOD

[76] Inventors: John T. Thompson, 244 Loring St., Los Angeles, Calif. 90024; George W. Gillemot, 233 20th St., Santa Monica, Calif. 90405

[22] Filed: July 6, 1971

[21] Appl. No.: 159,715

[52] U.S. Cl. ............ 206/47 A, 53/26, 174/76, 206/46 R, 264/271
[51] Int. Cl. ............................................. B65d 79/00
[58] Field of Search ........................... 174/76, 87; 206/46 R, 46 L, 46 PV:47 R, 47 A, 56 G, 84; 264/271; 339/93 L, 114–116; 53/36; 29/40

[56] References Cited
UNITED STATES PATENTS

| | | | |
|---|---|---|---|
| 3,077,262 | 2/1963 | Gaste | 206/47 A |
| 2,931,148 | 4/1960 | Smith | 206/84 X |
| 2,050,812 | 8/1936 | Schweitzer | 206/56 G X |
| 3,082,867 | 3/1963 | Gelpey | 206/47 A |
| 3,087,606 | 4/1963 | Bollmeier et al. | 206/47 A |
| 3,166,871 | 1/1965 | Simison | 206/46 R X |

*Primary Examiner*—Herbert F. Ross
*Assistant Examiner*—Steven E. Lipman
*Attorney*—W. D. Sellers and George A. Brace

[57] ABSTRACT

A protective encapsulating enclosure for and method of protecting spliced wires, terminal strip assemblies and the like from the elements and contact with foreign bodies. The enclosure may be formed of tough, flexible, impervious material and is precharged in selected portions with a quantity of non-setting gel-like potting compound. This charge is retained in place during storage and shipping by one of several simple expedients so that the gel-free portion of the bag can be readily expanded to receive the splice or terminal strip and then secured closed about the wires after which the walls are kneaded until the splice and/or terminal strip has been completely immersed in the compound.

20 Claims, 10 Drawing Figures

Patented Aug. 14, 1973

INVENTORS.
JOHN T. THOMPSON
GEORGE W. GILLEMOT
BY
ATTORNEYS

Patented Aug. 14, 1973

INVENTORS.
JOHN T. THOMPSON
GEORGE W. GILLEMOT
BY

GEL ENCAPSULATING ENCLOSURE AND METHOD

This invention relates to protective splice enclosure assemblies and more particularly to a unique splice enclosure precharged with non-setting gel-like potting compound and to a method of protecting wire splices and terminal strip assemblies having various advantages over techniques heretofore proposed.

It has long been common practice to encapsulate spliced conductors and terminal connections to insulate and isolate such connections from contact with other objects and from atmospheric and other harmful environments. The potting compounds commonly used for these purposes vary widely in composition and properties but substantially all solidify upon polymerizing or setting and must be destroyed to gain access to the splice connections.

To avoid the obvious and many shortcomings to this prior practice we have dislcosed in our copending aPplication for U.S. Letters Patent, Ser. No. 12,617, filed Feb. 19, 1970, now U.S. Pat. No. 3,585,275, a re-enterable splice assembly featuring a non-absorbent permanently non-setting potting compound having a gel-like consistency and found highly effective in protecting wire terminals. The assembly there disclosed is highly satisfactory for use in protecting individual splice pairs and small groups of splice connections but is inconvenient for use in encapsulating larger groups of splice wires, and particularly terminal strip assemblies and the like, owing to the difficulty experienced in inserting these larger assemblies into the gel without displacing the gel and interfering objectionably with the distribution of the gel about all parts of the unit being encapsulated.

By this invention these uncertainties and inconveniences are eliminated. These objectives are accomplished by the aid of a specially prepared encapsulating enclosure wherein the gel-like potting compound is initially confined to portions only of the flexible walled enclosure bag with other parts of the bag free of the compound. Preferably but not necessarily, the enclosure is supplied with the gel charge at the point of manufacture and is then packaged for storage and shipment in such a way that the compound remains restricted to the desired selected areas of the enclosure until ready for use. At that time the enclosure bag is opened and the gel-free areas are readily expanded to provide adequate room for the insertion of the terminal strip or other unit following which the enclosure is gathered about the wires and snugly secured in place thereabout. The flexible container is then kneaded until the gel is properly distributed about the terminal unit to isolate the latter from the surrounding environment and any moisture or contaminants harmful to the connections.

The invention components and method of their use not only provides either temporary or permanent protection, but permits re-entry and access to the terminals at any time for inspection, testing, checking or a change of terminal connections.

Accordingly, it is a primary object of the present invention to provide an improved, inexpensive, expedited mode of providing spliced conductors, terminal strips and the like assemblies with a fluid-proof insulative re-enterable splice enclosure charged with a non-setting encapsulating compound.

Another object of the invention is the provision of a re-enterable splice enclosure employing a flexible walled impervious bag precharged in selected areas only thereof with a non-setting gel-like potting compound in adequate quantity to completely surround and encapsulate conductor splices and terminal strip assemblies.

Another object of the invention is the provision of a prepared splice enclosure charged with non-setting gel-like potting compound with means for holding the charge segregated in selected areas of the bag and leaving a gel-free zone of adequate size to permit the insertion of a splice assembly.

Another object of the invention is the provision of a splice enclosure bag having measured quantities of a non-setting gel-like potting compound distributed along the opposite interior sides thereof and held so isolated by means applied to the terior of the bag holding the walls between isolated portions of the compound pressed against one another until the enclosure is ready for use.

These and other more specific objects will appear upon reading the following specification and claims and upon considering in connection therewith the attached drawing to which they relate.

Referring now to the drawing in which a preferred embodiment of theinvention is illustrated:

Figure 1:
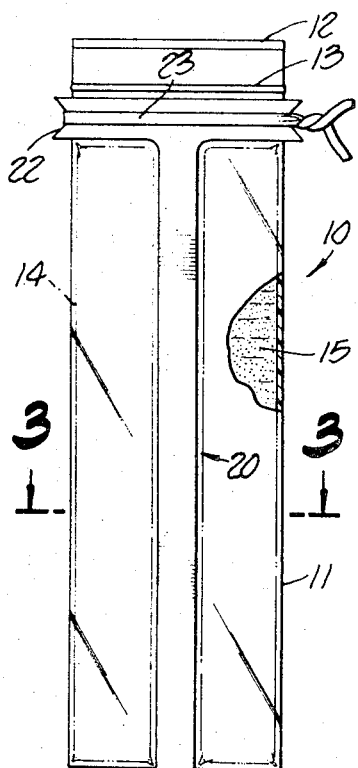
FIG. 1 is an elevational view of an illustrative embodiment of the invention splice enclosure bag prepared for storage and shipment.
Figure 2:
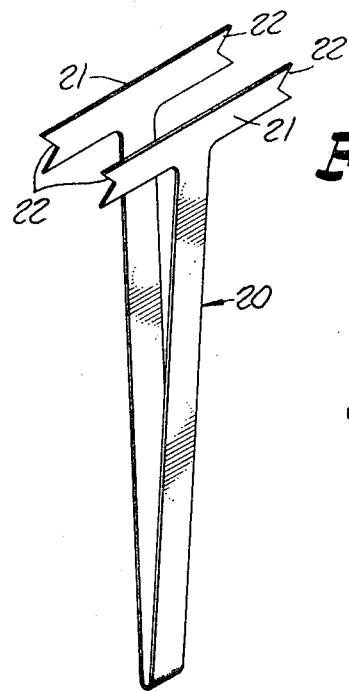
FIG. 2 is a perspective view of the device used in FIG. 1 to hold separate portions of the potting compound isolated from one another.
Figure 3:
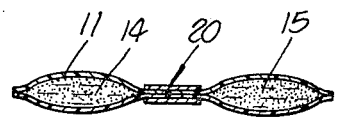
FIG. 3 is a cross-sectional view taken along line 3—3 on FIG. 1.

Referring initially more particularly to FIGS. 1–3, there is shown one illustrative embodiment of the invention designated generally 10. The precharged splice enclosure there shown comprises an elongated bag 11 of tough, flexible, impervious, thermoplastic material of a composition which remains flexible over a wide temperature range and is resistant to abrasion and attack by the elements. As there shown for use in encapsulating any of a wide range of terminal strip assemblies, bag 11 is relatively long and narrow and foldable flat before being charged with potting compound. The inlet end 12 of the bag is preferably provided with an internesting plastic tongue and groove seam 13 of a type well known in the plastic bag art. Seam 13 is located somewhat below the inlet end of the bag in order to provide a finger grip for use in pulling the side walls away from one another to open seam 13. The seam is reclosed simply by pressing the opposite side walls against one another so that the tongue on one side wall interlocks with the complementally shaped groove facing the tongue and attached to the other side wall of the bag inlet.

Prior to shipment to the point of use, bag 11 is preferably precharged with a non-absorbent insulating potting composition of the type disclosed in our aforementioned copending application. This composition which permanently retains its non-setting gel-like properties comprises about 85 percent petrolatum heat-blended with about 15 percent low density polyethylene. As shown in FIG. 1, this composition is charged into bag 11 in two long strips 14,15 and in such manner as to leave a gel-free void extending generally centrally and lengthwise of the bag. The size of this gel-free void may vary over a considerable range depending upon the size and volume of the terminal components to be encapsulated.

To assure that the two charges 14,15 remain segregated until the terminal strip has been inserted, there is provided a holding device, designated generally 20, and shown in its relaxed pre-assembled condition in FIG. 2. This holding device is preferably formed in one piece from suitable, flexible, rigid material such as metal or a suitable semirigid thermoplastic. The device is generally V-shaped with the ends of its two legs projecting laterally as indicated at 21,21 and provided with tie-retaining keepers or notches 22 at their outer ends. Holder 20 is applied astride the opposite sides of the bag from its bottom and as it indicated in FIGS. 1 and 3 after the bag has been charged with the two strips of compound 14,15. The two legs of the main body of the strip are pressed toward one another from the lower end thereby pressing the sidewalls of the bag against one another as air escapes through the bag inlet. A soft wire tie-strip 23 is then secured in place while seated in notches 22. During this operation seam 13 is also pressed closed to safeguard against the entry of moisture or foreign material and the splice enclosure is now ready for storage or shipment to the point of use.

Figure 4:
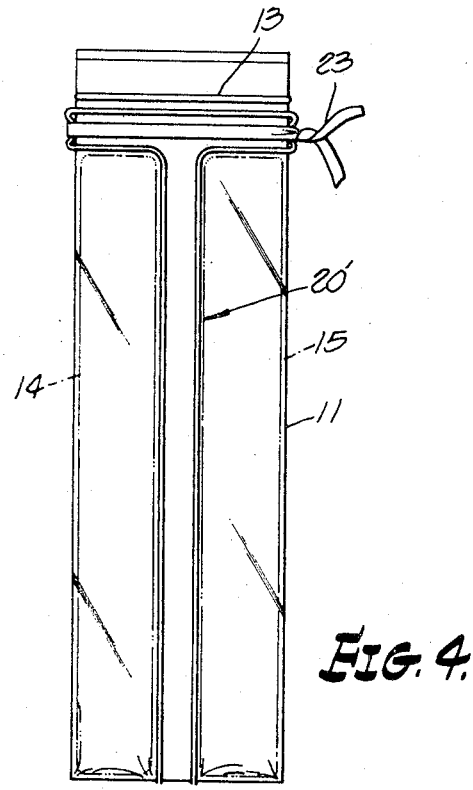
FIG. 4 is a view similar to FIG. 1 but showing a modified device for holding the portions of potting compound segregated.
Figure 5:
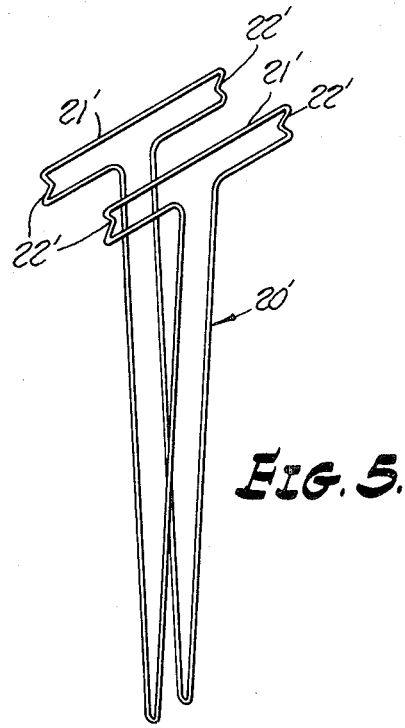
FIG. 5 is a perspective view similar to FIG. 2 of the modified holding device.

FIGS. 4 and 5 show a modified holding device, designated generally 20', applied to the splice enclosure bag 11 in lieu of the first described holder. This holder differs from that described above only in being formed of stiff, resilient, round stock bent into the configuration best illustrated in FIG. 5. This holding device likewise may be formed of spring wire or stiff, resilient, thermoplastic material. As will be readily apparent to the observer, the purpose and function of holder 20' is identical with that described above in connection with FIGS. 1–3.

Figure 6:
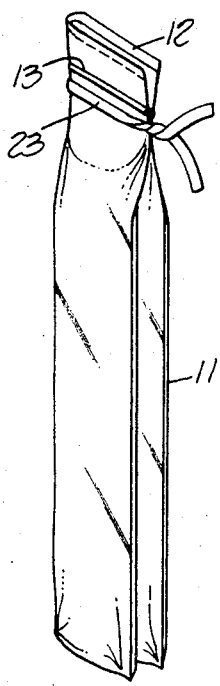
FIG. 6 is a perspective view of another mode of packaging the splice enclosure to hold the potting compound in a desired area of the bag.
Figure 7:
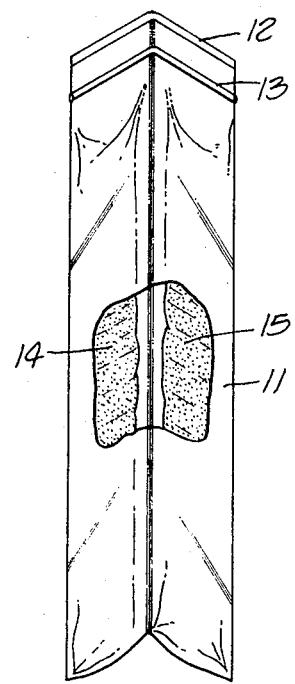
FIG. 7 is a perspective view of FIG. 6 before being fully folded and tied.

Referring now to FIGS. 6 and 7, there is shown still another expedient useful in holding charges 14,15 of potting compound gel segregated from one another during storage and shipment. Bag 11 is charged with the gel compound precisely as described above in connection with FIGS. 1–5. Thereafter the bag is folded along the mid length of the gel-free area in the manner made clear in FIGS. 6 and 7. It will be recognized that the portions of the bag wall free of gel lie pressed against one another when the two halves of the bag are folded together as shown in FIG. 6. Tie strip 23 is then applied to the folded halves of the bag immediately beneath seam 13. Greater care must be exercised in handling and packaging the resulting assembly since obviously substantial pressure applied to the flattened package can cause gel to migrate toward the folded edge of the bag. However, with suitable and simple precautions it is found that this mode of packaging the splice enclosure is highly satisfactory.

It will be understood that, if desired, the entire charge of gel may be confined to one lateral edge of the bag with the other half free of gel and folded flat against the charged side. This mode of use requires somewhat greater manipulation to assure proper distribution of the gel at the time of assembly to a terminal strip.

Figure 8:
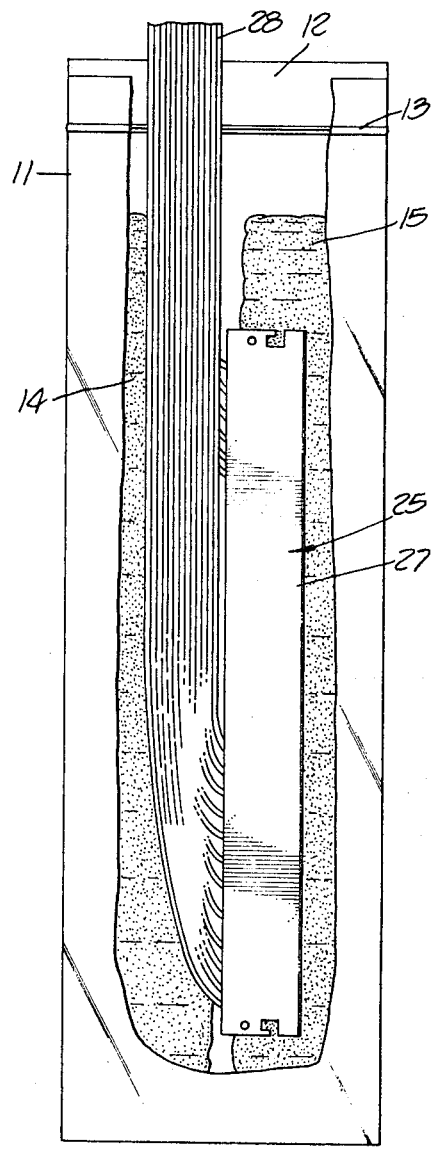
FIG. 8 is an elevational view with portions of the enclosure wall broken away and showing a terminal strip assembly inserted but prior to kneading the bag.
Figure 9:
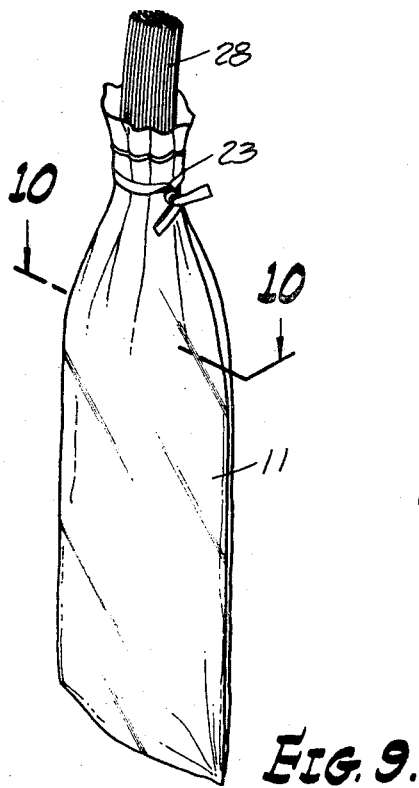
FIG. 9 is a perspective view of the splice assembly with the bag inlet gathered about the wires and after the bag has been kneaded to distribute the potting compound.
Figure 10:
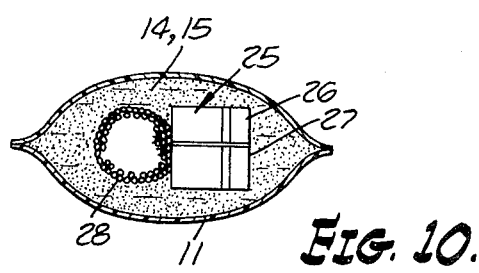
FIG. 10 is a cross sectional view taken along line 10—10 on FIG. 9 and showing the terminal strip assembly completely immersed in the compound.

Referring now to FIGS. 8, 9 and 10 bag 11, charged with compound in accordance with any of the techniques referred to above, is shown in open condition in FIG. 8. One of the many conventional types of wire terminal strips 25 may be inserted through the open top of the bag into its fully assembled postion within the bag. The terminal strip 25, as there shown, is formed in two halves 26,27 and held suitably interlocked with one another about a series of internal connections to wires 29 projecting from and along one lateral edge of the strip and through the bag inlet 12. As is quite evident from FIG. 8, it would be a difficult and unsatisfactory operation to attempt insertion of terminal strip 25 and its attached bundle of wires 28 except for the provision of the gel-free area extending along the mid length of bag 11.

This is because of the thick gel-like consistency of the compound and its high tenacity and coherence for surfaces brought into contact therewith. These properties make it difficult to charge the compound into the bag after the terminal unit has been inserted. If, on the other hand, an attempt is made to insert the asembly through the body of gel, the gel tends to be pushed to the bottom of the bag and difficulty is experienced in distributing the gel back along the sides and about the top of the inserted unit. However, the insertion is accomplished with ease, facility and expedition, according to the principles of the present invention, utilizing the void free area for the insertion operation. Once the unit is properly positioned between the opposite ends of the bag, the inlet portion is gathered snugly about wires 28 and tie strip 23 is again applied about the bag to hold it snugly gathered about the wires. Thereafter, the operator kneads the soft, pliant bag 11 between his fingers until he is sure that the gel is properly and thoroughly in contact with all exterior surfaces of the wires and the terminal strip, a condition best shown in FIG. 10.

Should the user have need for gaining access to the terminals for any purpose, including testing, inspection, or the addition or removal of any wire, he need but remove tie 23 and withdraw the terminal unit from the top of the bag. In so doing, he uses his fingers to apply pressure against the inlet end of the bag in order to retain a maximum of the encapsulating compound captive in the bag. After servicing of the unit has been completed it is customary to employ a fresh splice enclosure charged with encapsulating gel and assembled in the same manner previously described to protect the terminal assembly.

While the particular gel encapsulating enclosure and method herein shown and disclosed in detail is fully capable of attaining the objects and providing the advan-

We claim:

1. A protective encapsulating enclosure for a conductor terminal assembly and the like comprising: a bag of tough impervious flexible material having an inlet and charged with a quantity of non-setting gel-like encapsulating material having a pronounced tendency to adhere to surfaces in contact therewith and confined to a portion of said bag extending generally axially of said inlet and leaving the inlet end portion and another lengthwise portion of said bag free of gel and large enough to receive a conductor terminal assembly to be encapsulated in said encapsulating material, and means substantially transversely of and holding said inlet releasably closed until a conductor terminal assembly is ready for insertion through said bag inlet and into the gel-free portion of the interior thereof.

2. An encapsulating enclosure as defined in claim 1 characterized in that said bag is long, relatively narrow and initially flat with a portion of said charge of gel-like material disposed along one interior lateral side thereof.

3. An encapsulating enclosure as defined in claim 1 characterized in that said charge of gel-like material is confined in part to either interior lateral edge portion of said bag and to either side of said gel-free portion.

4. An encapsulating enclosure as defined in claim 1 characterized in that said means for holding said bag closed until ready to receive a terminal assembly comprises means held applied against the exterior of said bag opposite the gel-free portion thereof and effective to maintain portions of the opposite walls of the bag in contact with one another and out of contact with said gel-like material.

5. An encapsulating enclosure as defined in claim 1 characterized in that said bag is long and narrow with a portion of said gel-like material distributed along one interior lateral edge thereof, and said holding means being applied to the exterior of said bag after one lateral edge of said bag has been folded over and closed beside the other lateral edge thereby to provide a fold along the mid-length of said bag effective to prevent migration of gel-like material across said fold during storage shipping and normal handling conditions prior to use of the enclosure.

6. An encapsulating enclosure as defined in claim 1 characterized in that said bag is formed of thermoplastic material having interneting tongue and groove seam forming means facing toward one another along the interior faces of the bag inlet.

7. An encapsulating enclosure as defined in claim 4 characterized in that said holding means is generally V-shaped with the ends of its legs having a width corresponding generally to the flattened width of said bag inlet and including means for holding said legs closed against one another from the opposite sides of said bag thereby to confine said gel-like material to the lateral side portions of said bag.

8. An encapsulating enclosure as defined in claim 7 characterized in that said holding means is formed of resilient material and in that the opposite lateral end edges of said legs are notched to provide keeper seating means for said tie means.

9. An encapsulating enclosure for encapsulating a conductor terminal strip assembly to protect the latter from atmospheric conditions comprising, a flexible waterproof bag having an inlet at one end and a charge of gel-like non-setting potting compound having a pronounced tendency to adhere to surfaces in contact therewith and confined to selected portions of the interior of said bag with a portion of the interior in communication with the bag inlet substantially free of said potting compound and in readiness for the insertion therealong of a conductor terminal strip assembly and the conductors attached thereto, means for holding said inlet closed, and means for maintaining said potting compound segregated in said selected portions of said bag until such time as the bag is needed to encapsulate a conductor terminal assembly and the conductor ends attached thereto.

10. That method of providing an encapsulating enclosure for a conductor terminal strip assembly to protect the latter from atmospheric conditions which method comprises: providing a flexible waterproof bag having an inlet at one end and a charge of gel-like non-setting potting compound having a pronounced tendency to adhere to surfaces in contact therewith and confined to selected portions of the interior of said bag with a portion of the interior in communication with the bag inlet substantially free of said potting compound and in readiness for the insertion therealong of a conductor terminal strip assembly and the conductors attached thereto, holding the bag inlet closed, and maintaining said potting compound segregated in said selected portions of said bag until such time as the bag is needed to encapsulate a conductor terminal assembly and the conductor ends attached thereto.

11. That method defined in claim 10 characterized in the steps of distributing said charge of gel-like material along one interior lateral side of said bag, folding the other side of said bag over and against the gel-charged side thereof, and applying means about the thus-folded inlet end of said bag to maintain the same folded until ready to receive a terminal strip assembly.

12. That method defined in claim 10 characterized in the steps of distributing said charge of gel-like material along either interior lateral side of said bag with the intervening mid-portion of said bag substantially free of said gel-like material, folding the opposite lateral sides of said bag against one another with the sides of the gel-free mid-portion of the bag lying against one another, and applying means to the exterior of the bag to hold the same so folded until ready to receive a terminal strip assembly.

13. That method defined in claim 10 characterized in the steps of holding said bag inlet closed and the gel-free portions of the bag flattened by applying to the opposite outer sides of the bag resilient rigid means effective to hold the walls of the gel-free portions of said bag compressed against one another, and applying retainer means about said bag and about said rigid means to maintain the bag walls in contact with said rigid means compressed together until use of the bag to receive terminal strip means.

14. That method defined in claim 10 characterized in the steps of expanding the inlet of said bag and the gel-free portions thereof, inserting a terminal strip assembly into the gel-free portion of said bag with the wires attached thereto extending outwardly from said inlet in a compact group, gathering and securing the inlet end of the bag about said compact group of wires, and kneading the bag and its contents until said terminal strip assembly is immersed in said gel.

15. That method defined in claim 10 characterized in the step of maintaining said potting compound segregated in said selected portions of said bag by holding the portions of the bag walls free of said potting compound substantially flattened in contact with one another.

16. That method defined in claim 15 characterized in the step of securing the enshrouded ends of said conductors together before inserting the same through said bag inlet.

17. That method defined in claim 15 characterized in the step of anchoring said enshrouding conductor ends to a terminal strip before inserting the same through said bag inlet and securing the latter about said conductors.

18. That method defined in claim 17 characterized in the step of kneading said flexible walled bag to distribute said gel-like compound about said terminal strip to embed said terminal strip in said compound.

19. A method of providing an encapsulating enclosure for conductor terminal assemblies and the like comprising, providing a bag of tough impervious flexible material having an inlet, and charged with a quantity of a non-setting gel-like encapsulating material having a pronounced tendency to adhere to surfaces in contact therewith and confined to a portion of said bag extending generally axially of said inlet while leaving the inlet portion and an associated lengthwise portion of said bag free of said gel-like material and large enough to receive a conductor terminal assembly to be encapsulated in said encapsulating material, and releasably holding said bag inlet closed transversely thereof until a conductor terminal assembly is ready for insertion through said bag inlet and into the gel-free portion of the interior thereof.

20. That method of encapsulating a plurality of conductor ends enshrouded by non-conductive material which comprises: providing a flexible walled bag having an inlet and enclosing a charge of gel-like non-setting compound arranged in two principal spaced-apart portions in alignment with said inlet and in readiness for the insertion of the enshrouded ends of conductors, inserting said enshrouded conductor ends through said bag inlet and between said spaced apart portions of said non-setting compound and securing said bag inlet snugly about said conductors with the enshrouded ends thereof submerged in said non-setting compound.

* * * * *